United States Patent [19]
Koizumi et al.

[11] Patent Number: 5,477,621
[45] Date of Patent: Dec. 26, 1995

[54] ELECTRICAL CAPACITANCE INSTRUMENT AND MANUFACTURING METHOD OF THE SAME

[75] Inventors: Hiroshi Koizumi; Toshiyuki Shirai; Tamio Suzuki, all of Utsunomiya, Japan

[73] Assignee: Mitutoyo Corporation, Tokyo, Japan

[21] Appl. No.: 231,053

[22] Filed: Apr. 22, 1994

[30] Foreign Application Priority Data

Apr. 26, 1993 [JP] Japan ................................. 5-099355
Nov. 19, 1993 [JP] Japan ................................. 5-290675

[51] Int. Cl.$^6$ ........................... G01B 3/20; G01B 5/02
[52] U.S. Cl. ........................... 33/784; 29/592.1
[58] Field of Search ................. 33/783, 784, 706, 33/708, 813, 819; 29/592.1; 361/277, 287, 294; 427/79, 80, 81

[56] References Cited

U.S. PATENT DOCUMENTS

| | | | |
|---|---|---|---|
| 4,586,260 | 5/1986 | Baxter et al. | 33/706 |
| 4,612,656 | 9/1986 | Suzuki et al. | 33/784 |
| 5,083,383 | 1/1992 | Heger | 33/366 |

FOREIGN PATENT DOCUMENTS

| | | |
|---|---|---|
| 0411152A1 | 2/1991 | European Pat. Off. . |
| 2391451 | 5/1978 | France . |
| 2078966 | 1/1982 | United Kingdom ............. 33/706 |

OTHER PUBLICATIONS

D. R. Dobson, et al.; "Position Encoder;" IBM Technical Disclosure Bulletin vol. 21, No. 1, Jun. 1978.

Von Kurt Häuser; Messschieber (Schieblehren); Technische Rundschau, vol. 73, No. 23, 2 Jun. 1981.

Primary Examiner—William A. Cuchlinski, Jr.
Assistant Examiner—G. Bradley Bennett
Attorney, Agent, or Firm—Oliff & Berridge

[57] ABSTRACT

An electrical capacitance instrument achieving high-volume production and a manufacturing method for the same. In a slide caliper detecting a change of electrical capacitance upon a displacement value of the slider 10 in relation to the base scale 1 having the main scale 20 of the measuring standard, the improved slide caliper is structured by the main scale 20 defined by plural electrodes 21 printed on a surface of the base plate 22 made of an insulator film at predetermined intervals with electrically conductive ink, and the base scale 1 is made by injection molding using a material of engineering plastics on which the main scale 20 is applied securely, so that the slide caliper can be manufactured in large numbers.

13 Claims, 6 Drawing Sheets

ELECTRICAL CAPACITANCE INSTRUMENT AND MANUFACTURING METHOD OF THE SAME

BACKGROUND OF THE INVENTION

1. Field of the Invention

This invention is broadly concerned with an electrical capacitance instrument and a manufacturing method of the same and intended particularly to be used to improve a high-volume productivity of electrical capacitance instrument and a manufacturing method thereof.

2. Description of the Related Art

Conventionally, in the art of measuring instruments such as slide calipers, there has been employed an electronic one having a digital display to prevent or decrease artificial mistakes when reading out measured value with the eye.

The conventional electronic measuring instrument is generally defined by a main body and a measuring element adapted to move in relation to the main body. The instant displacement value of the measuring element is transformed into electrical signals by conventionally known electrical capacitance instrument to be displayed in numerical values.

The electrical capacitance instrument includes a main scale which has a plurality of electrodes thereon arranged at a fixed spacing from one another and a measuring element which has electrodes corresponding to the electrodes provided on the main scale in a statically relating state. The displacement value of the measuring element is transformed into electrical signals based on the electrical capacitance changed in accordance with the displacement value of the measuring element.

Incidentally, the main scale is generally manufactured separately from a main body of the instrument and then secured on the main body by means of a bonding agent.

However, the manufacturing process for the main scale does not attain a high-volume productivity due to several steps, that is, a step for evaporating metal membrane on a base plate made from epoxy-glass having insulation properties, a step for masking necessary area on the metal membrane, a step for forming plural electrodes by etching unnecessary area on the metal membrane, and a step for forming an insulation membrane to cover surface of the electrodes.

It would be therefore difficult to achieve a preferable high-volume productivity of the measuring instrument having such a main scale even though the production of other parts except the main scale will be improved.

Accordingly, an object of the present invention is to provide an ideal electrical capacitance instrument for high-volume production and a manufacturing method of the same.

SUMMARY OF THE INVENTION

Accordingly, the present invention is to provide the improved electrical capacitance instrument having a main scale of a measuring standard, a main body defined by the main scale, and a measuring element adapted to move in relation to the main body to thereby measure a displacement value of the measuring element relative to the main body. The main scale includes plural electrodes printed on the main body with an electrically conductive ink at predetermined intervals along a movement direction of the measuring element.

Incidentally, the plural electrodes may be printed on one surface of a base plate made of insulator film applied on the main body. When printing plural electrodes on the main body directly, the main body is made of a material having insulation properties and the plural electrodes are shielded by a coating layer made of a material having insulation properties.

The main scale may be applied to the main body by means of a bonding layer provided on a surface to which the plural electrodes of the base plate are preliminarily printed. Incidentally, the main body uses a material having insulation properties, particularly engineering plastics (e.g., a synthetic resin of polybutylene terphthalate) as its base material and the base material may further include a mineral such as kalium titanate. The base plate is preferably made of a film having plasticity.

The base plate can be made of a transparent material and is able to further include a decorative printing layer between one surface of the base plate and an electrode layer.

The main body may be a base scale having at least one measuring jaw, and wherein the measuring element is adapted to move along the base scale in a sliding contact state with the base scale and has at least one measuring jaw corresponding to that of the base scale.

The improved manufacturing method of an electrical capacitance instrument according to the present invention has a main scale of a measuring standard, a main body defined by the main scale, and a measuring element adapted to move in relation to the main body to thereby measure a displacement value of the measuring element relative to the main body, and is characterized to have the steps of: forming the main scale by printing plural electrodes on one surface of a base plate made of an insulator film at certain intervals with an electrically conductive ink; and applying the main scale to the main body.

When applying the main scale to the main body, it is recommended to form a bonding layer on a surface to which the electrodes of the base plate are preliminarily printed and apply the main scale to the main body via the bonding layer.

The base plate can be made of a transparent material and the invented method can further include a step for making a decorative printing layer to print characters or patterns on the base plate and printing plural electrodes on the decorative printing layer. Incidentally, the main body can be formed by means of an injection mold using a material having insulation properties.

According to the above mentioned invention, as the main body is provided with the main scale having plural electrodes printed by means of an electrically conductive ink, in comparison with the conventional method of making a main scale by forming electrodes thereon by etching, the production work of the main scale becomes easy and simple.

When printing electrodes on one surface of the base plate of an insulator film to obtain the main scale, the same ones can be produced in large numbers and finally a high-volume productivity of the electrical capacitance instrument can be achieved.

When applying the main scale to the main body, after the bonding layer is formed by applying a bonding agent on a surface on which the electrodes of the base plate are preliminarily printed, the bonding layer will smoothly work to apply the main scale on the main body and an insulation layer will not be required. If the base plate is of a film having plasticity, it will be preferable to apply the main scale to the main body securely.

As the base plate is made of a transparent material and the decorative printing layer is between the base plate and the electrode layer, the painted characters or patterns on the decorative printing layer can be read out through the base plate.

If the material for the main body employs a material having insulation properties, particularly engineering plastics capable of being molded by injection, a large number of the same main bodies can be produced. Furthermore, the main body itself becomes an insulation member, so that there is no necessity to prepare an insulation layer additionally between the main body and the main scale to keep enough insulation properties.

Accordingly, a high-volume production of the electrical capacitance instrument can be achieved.

DETAILED DESCRIPTION OF THE PREFERRED EMBODIMENT(S)

Figure 1:
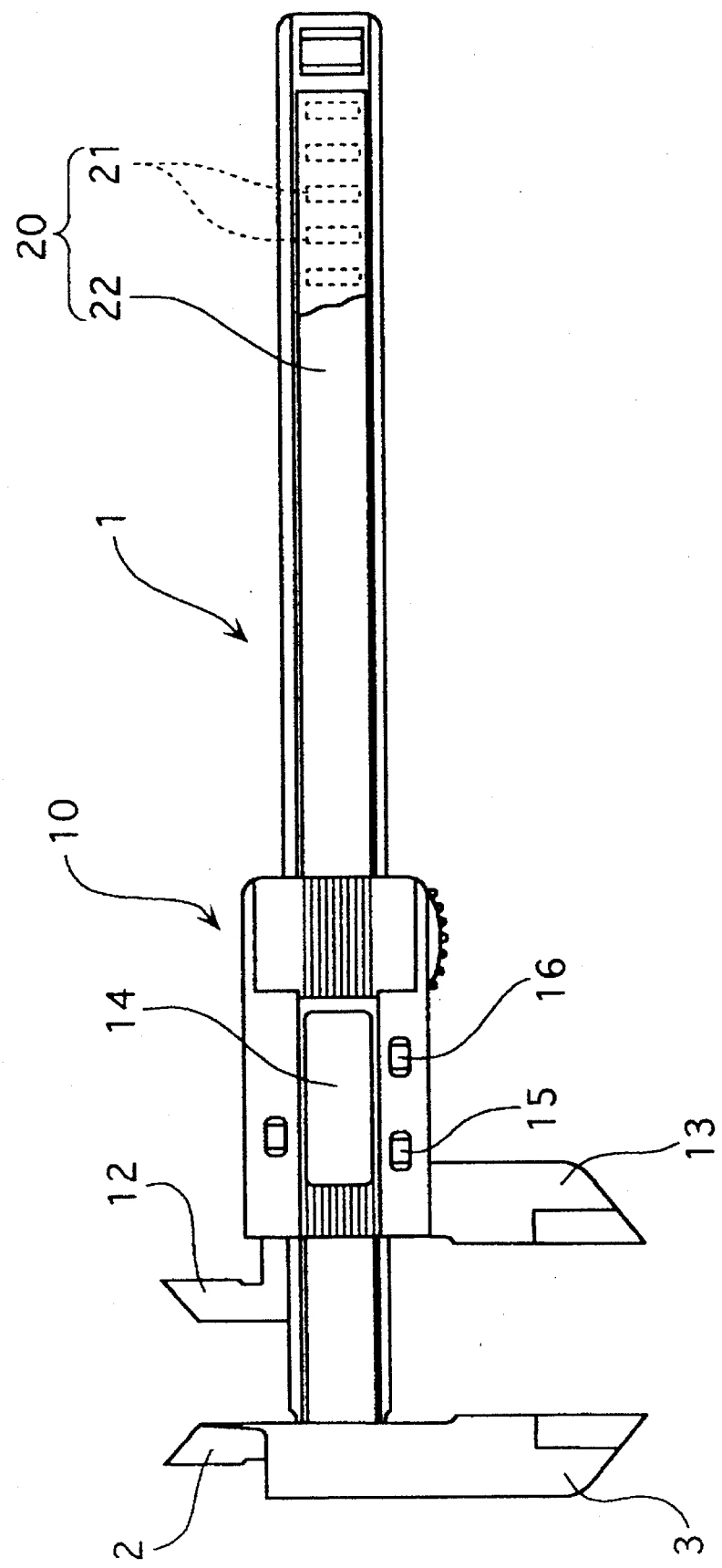
FIG. 1 is a front view of the appearance of the overall composition of a slide caliper in the first embodiment of the present invention.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

The preferred embodiment of the present invention will now be described with reference to the drawings.

[FIRST EMBODIMENT]

The first embodiment according to the present invention will hereunder be described with reference to FIGS. 1–4. The following first embodiment discloses a slide caliper in which an electrical capacitance instrument according to the present invention is preferably utilized. The slide caliper is, as shown in FIG. 1, defined by a base scale 1 of a main body laterally extending on the drawing and a slider 10 of a measuring element movable in a longitudinal direction on the base scale 1.

The base scale 1 is made by an injection molding method by means of engineering plastics having sufficient insulation properties. The engineering plastics uses a synthetic resin of polybutylene terphthalate (hereinafter referred to "PBT") resin as a base material and additionally includes minerals such as kalium titanate to have stiffness and wear-resistance properties and lightness in weight compared with steel. The weight of the base scale 1 is lightened in weight by about one fifth of that made of metal.

As can be seen from the drawing, there is attached integrally to a left end most portion of the base scale 1 an inboard measuring jaw 2 extending upwardly on the drawing and an outboard measuring jaw 3 extending oppositely or downwardly on the drawing. The base scale 1 is provided with a main scale 20 in a state that the front surface of the base scale 1 is entirely covered with the main scale 20. The main scale 20 has at a fixed spacing from one another a plurality of lattice electrodes 21 defining an electrical capacitance encoder 40.

Now, the slider 10 is produced by means of the same material (engineering plastics) and the same method (injection molding method) as those in the base scale 1. The slider 10 has at the left end an inboard measuring jaw 12 and an outboard measuring jaw 13 to correspond to the inboard measuring jaw 2 and the outboard measuring jaw 3 of the base scale 1 respectively. In an enclosed space at the front side of the slider 10, there are a digital display 14 to digitally display an instant displacement value of the slider 10, a power-off switch 15, a switch 16 serving both as a power-on switch and a zero-setting switch and so on.

Figure 2:
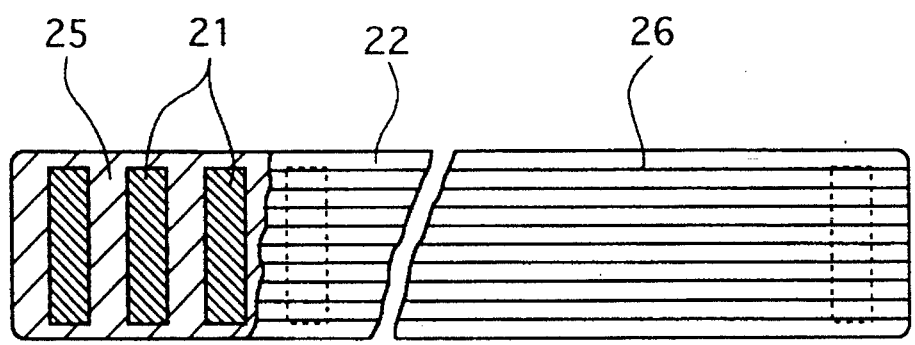
FIG. 2 is an enlarged plan view of a main scale in the first embodiment.
Figure 3:
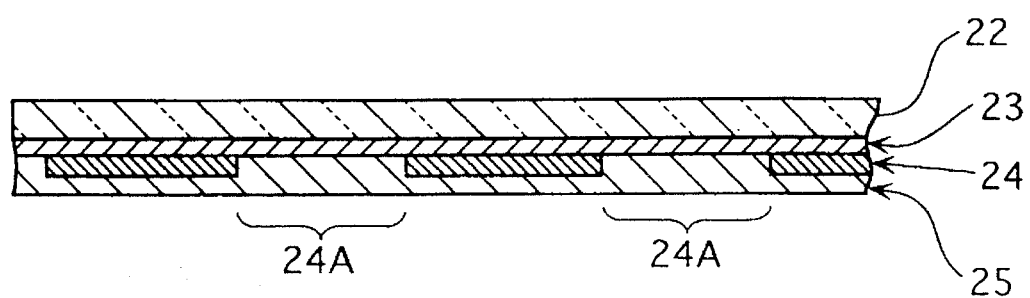
FIG. 3 is an enlarged sectional view of the main scale.

Now referring to FIGS. 2 and 3, the main scale 20 adapted to be put on the base scale 1 is depicted in an enlarged state. The main scale 20 should be understood as finished with a printing of electrodes 21 on a front surface of the web-shaped base plate 22. The main scale 20 has a multi-layer construction defined by a decorative printing layer 23, an electrode layer 24 and a bonding layer 25, each layer lying one above the other in this order or downwardly from the surface of the base plate 22 as shown in FIG. 3.

The base plate 22 is made of polyester transparent film having a thickness of 0.125 mm and plasticity properties and is formed into a predetermined configuration.

The decorative printing layer 23 is a membrane of the ink at a thickness of about 0.125 mm and is formed by being directly put on the surface of the base plate 22. The decorative printing layer 23 is used to draw characters or slit patterns 26. When drawing some characters or patterns, they can be seen from an opposite side of the base plate 22 since the base plate 22 is transparent.

The electrode layer 24 is a membrane of an electrically conductive ink (e.g., an electrically conductive ink containing carbon graphite, polyester resin and solvent by a weight ratio of 30%, 25 and 45% respectively) printed on the decorative printing layer 23 at a thickness of about 0.021 mm. The electrode layer 24 has plural rectangular electrodes 21 printed with electrically conductive ink along a longitudinal direction of the main scale 20. The shape of the electrode 21 can be defined by a long side which is almost the same in dimension as the width of the base plate 22 and a short side having a predetermined length.

The bonding layer 25 is a membrane of a bonding agent entirely applied over the electrode layer 24 with a thickness of about 0.16 mm. The applicable bonding agent is for example a double-adhesive tape. The bonding agent is supplied into spaces disposed between nearby electrodes 21 or portions other than the electrodes 21 of the electrode layer 24 until it reaches to the surface of the decorative printing layer 23.

Figure 4:
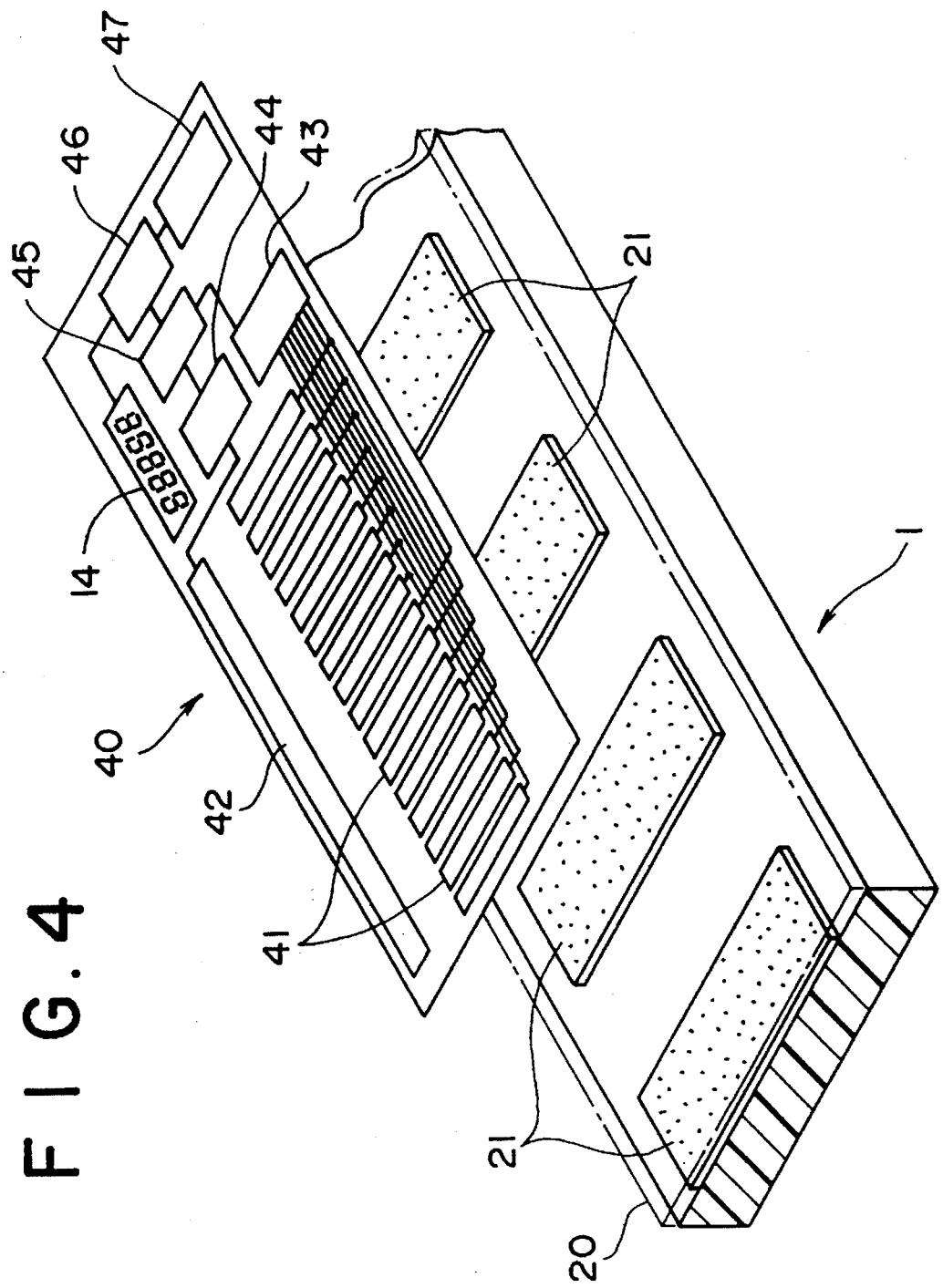
FIG. 4 is a view depicting an electrical capacitance encoder in the first embodiment.

Now referring to FIG. 4, the electrical capacitance encoder 40 is depicted in detail. The electrical capacitance encoder 40 is defined by the above explained lattice electrodes 21 which are printed successively on the base scale 1 at predetermined intervals, earth ground electrode (not shown) electrically arranged between these electrodes 21, plural sets of sending electrodes 41 provided in the slider 10 each of which is composed with eight electrodes arranged at certain intervals along the base scale 1, a receiving electrode 42 arranged along a series of the sending electrodes 41 in a web state, a sending circuit 43 to impress into the sending electrodes 41 signals dividing 360 degrees into eight different phases, a receiving circuit 44 to receive signals from the receiving electrode 42 presenting different phase based on an instant displacement value between the sending electrodes 41 and the electrodes An output from the receiving circuit 44 or originally issued from the electrical capacitance encoder 40 is counted in a counter 45 and then diplayed digitally by means of the digital display 14 after a predetermined processing in a CPU 46. Incidentally, the counted value in the counter 45 can be reset to a "0" value when the zero-setting switch 16 is pressed. If necessary, the measured value may be printed out or further processed through a transmitter 47 in an external printer by sending data processed in the CPU 46 through a cable or by radio.

In measurement, the slider 10 is moved to measure an object to be measured from a situation where the inboard measuring jaws 2 and 12 of the base scale 1 and the slider 10 are contacting each other. The displacement value of the slider 10 can be detected by the electrical capacitance encoder 40 and is then digitally displayed by means of the digital display 14. Accordingly, the measurement in the above mentioned first embodiment is performed simply by abutting the inboard measuring jaws 2 and 12 or the outboard measuring jaws 3 and 13 to both ends of the object to be measured respectively to obtain measured value on the digital display 14.

When measuring an inner diameter of a hole provided in the object to be measured, the measuring jaws 2 and 12 are respectively abutted an inner surface of the hole to digitally display the measured value by means of the digital display 14, which should be easy measuring work for an operator. When measuring a thickness of the object to be measured, the outboard measuring jaws 3 and 13 are utilized such that they are abutted to a portion to be measured to thereby obtain the objective thickness in digital by the digital display 14.

In manufacturing, plenty of main scales 20 are printed on a large polyester sheet all together and then covered entirely with the bonding agent to form the bonding layer 25, so that the respective main scales 20 can be obtained as required by cutting the large polyester sheet. In this process, the surface of the bonding layer 25 of the main scale 20 is preferably shielded with a temporary sheet cover until being attached on to the base scale 1, to secure the bonding layer 25 to ensure a firm attachment of the main scale 20.

As has been mentioned, the base scale 1 and the slider 10 are manufactured by means of the injection molding machine wherein the engineering plastics are consumed as materials. On the completed base scale 1, the main scale 20 is attached securely and then the base scale 1 is combined with the slider 10. The slider calipers according to the present invention will be completed after fine adjustments for several combined parts.

The first embodiment according to the present invention has merit in developing a high-volume production of the main scales 20, as a plurality of main scales 20 can be manufactured by printing electrodes 21 all at once on a large sheet of an insulator film. Since the base scale 1 and the slider 10 are made of engineering plastics which can be injected from a mold, a desirable high-volume production of the base scale 1 and the slider 10 can be achieved.

As the bonding layer 25 is formed by applying the bonding agents on the surface where the electrodes 21 of the base plate 22 are made in advance before attaching the main scale 20 to the base scale 1, the attachment of the main scale 20 toward the main body 1 can proceed smoothly by means of the bonding layer 25 and there is no necessity to provide an insulation layer additionally because of a mutual insulation state of the respective electrodes 21. The fine attachment work of the main scale 20 to the base scale 1 may be performed as the base plate 22 is made of a film having plasticity.

According to the combination of the transparent base plate 22 and the electrode layer 24 wherein the decorative printing layer 23 is between them, any character or pattern 26 printed on the decorative printing layer 23 can be seen clearly through the base plate 22.

The base scale 1 and the slider 10 are both made of engineering plastics so that the base scale 1 can be kept in an insulated state. It is not required to have the insulation layer between the base scale 1 and the main scale 20 to obtain insulation properties between nearby electrodes 21 of the main scale 20 attached on the base scale 1. Furthermore, the insulation properties between the electrodes 21 can be improved due to the mentioned bonding layer 25 for the main scale 20.

Since the electrodes 21 are formed by printing and the base scale 1 and the slider 10 are made of engineering plastics, the high-volume production of respective components is improved. As the bonding layer 25 smooths attachment to the main scale 20, the production of the slide calipers can be extremely improved to thereby achieve reduced cost. As the base scale 1 is made of engineering plastics, a further weight decrease can be achieved to thereby improve comfortable operation and handling.

Figure 5:
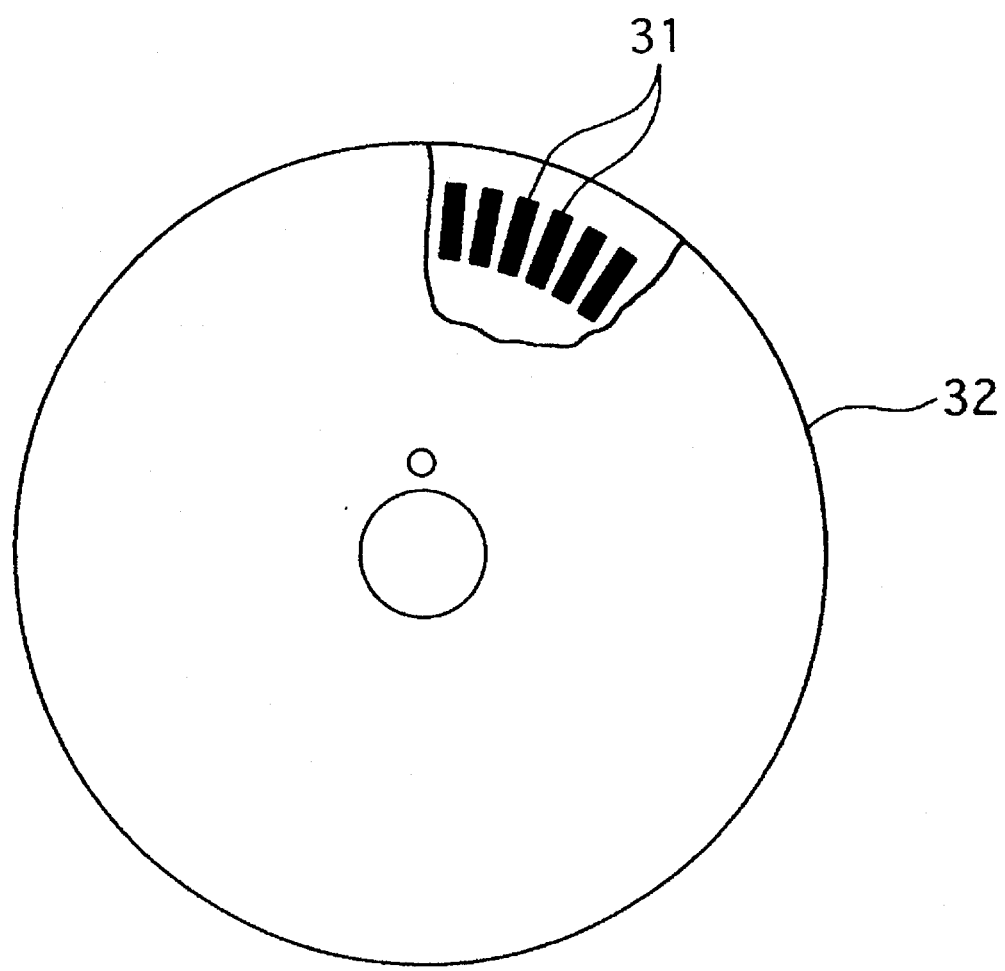
FIG. 5 is a plan view depicting a modification of the first embodiment.

In the above mentioned embodiment, the slide calipers measure a straight distance such as an inner diameter, length or the like by moving the slider 10 of the measuring element in a sliding contact state with the base scale 1, but the present invention can be applied also to a rotation in angle measuring instrument such as a rotary encoder to measure an angle of rotation degrees when a measuring element and a main scale are moved relative to each other. When applying the present invention to the rotation angle measuring instrument, the main scale should be formed, as shown in FIG. 5, into a disc-shaped base plate 32 made of synthetic resin film with plural electrodes 31 printed thereon at predetermined angular intervals.

[SECOND EMBODIMENT]

Figure 6:
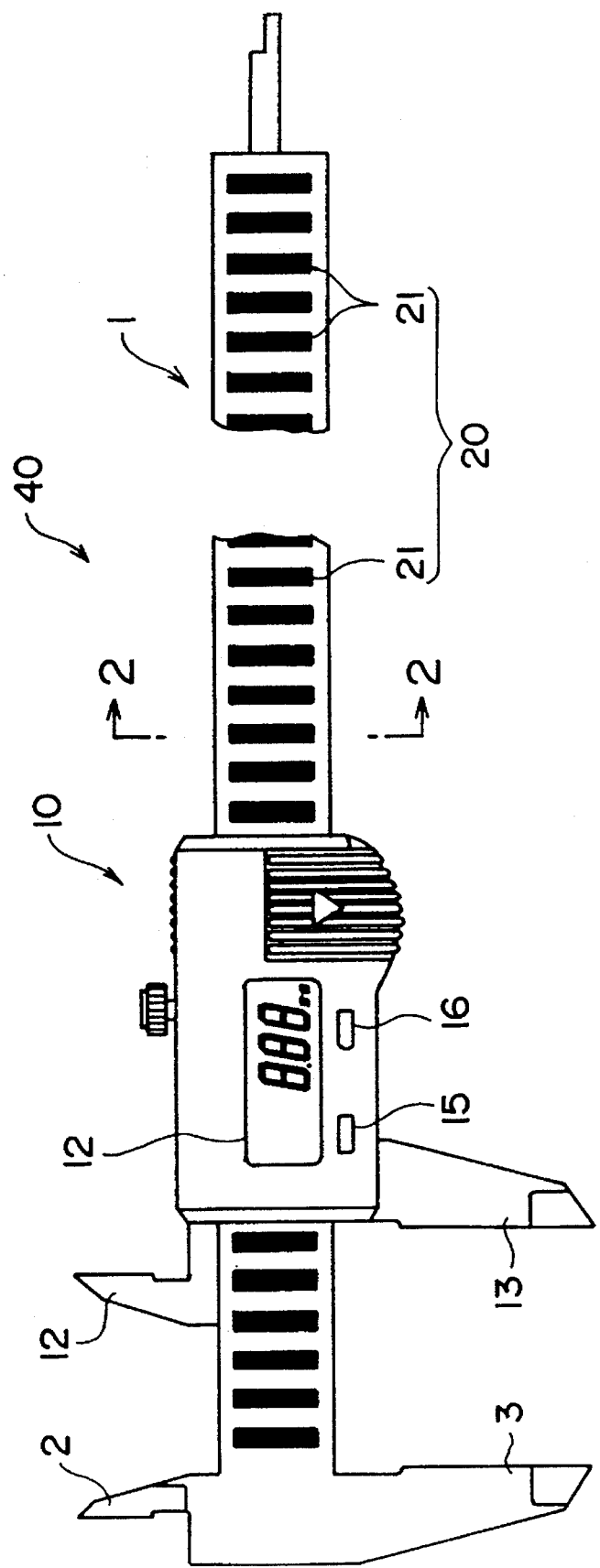
FIG. 6 is a front view depicting the appearance of the overall composition of a slide calipers in the second embodiment of the present invention.
Figure 7:
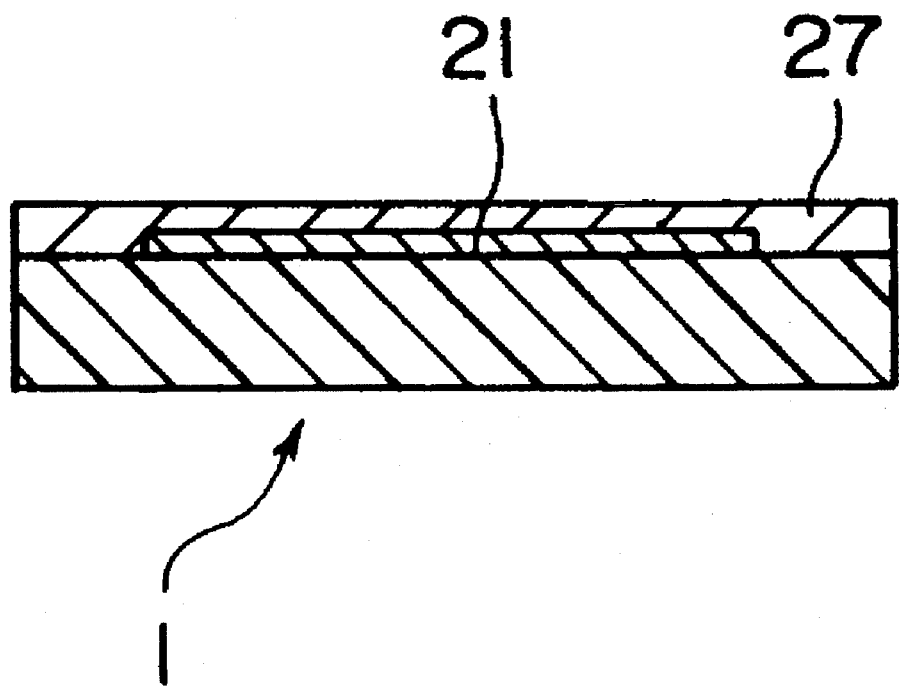
FIG. 7 is an enlarged sectional view depicting a main scale in the second embodiment.

The second embodiment according to the present invention is depicted in FIGS. 6 and 7. Incidentally, in the description of the following embodiments, the same reference numerals will be used to designate the same or similar components as those in the first embodiment, so that the description will be omitted or simplified.

In the following second embodiment, the present invention is also applied to a slide caliper. The slide calipers in the second embodiment has, as shown in FIG. 6, a base scale 1 of the main body having sufficient insulation properties and a slider 10 of the measuring element made of a material having insulation properties, the slider 10 being adapted to move in the lengthwise direction of the base scale 1.

The base scale 1 has thereon uniformly spaced electrodes (lattice electrodes) 21 defining the electrical capacitance encoder 40, the electrodes 21 being directly printed with an electrical conductive ink at predetermined intervals on the base scale 1 along the movement direction of the slider 10. The main scale 20 in this second embodiment is provided with the electrodes (lattice electrodes) 21 which are directly printed on the base scale 1. The electrodes (lattice electrodes) 21 are covered at the front surface thereof, as shown in FIG. 7, with an insulation coating layer 27 such as polyethylene film.

The base scale 1 and the slider 10 may be made of engineering plastics containing PBT resin which is already explained in the first embodiment and an additional mineral but it can be manufactured by means of a carbon fiber reinforced plastic (CFRP) which is composed with epoxy resin as base material and additional carbon fiber to have insulation properties. The carbon fiber (CF) can be based either on PITCH or PAN and formed into fiber spinning. It is preferable for the carbon fiber to be composed by weight with 96% long fibers, each fiber having the same length as a longitudinal length of the base scale 1, and 4% short fibers each having the same length as the width of the base scale 1. The carbon fiber used is preferably to be a layered sheet, each of which is woven with the long fibers and the short fibers, so as to intersect each other thereby becoming a plain weave fabric.

Accordingly, the main scale 20 can be manufactured simply and easily in this second embodiment since the electrodes 21 are directly printed on the base scale 1 having insulation properties. This second embodiment does not require an application of the main scale 20 the base scale 1 and thereby reduces the number of man-hours. Since the surface of the electrodes 21 are coated reliably by the coating layer 27 such as polyethylene film, the electrodes 21 are not damaged and the insulation properties between nearby electrodes 21 can be improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

For example, the base scale 1 is applied on the printed electrodes 21 formed on one surface of the base plate 22 in the first embodiment, but it can be provided on the opposite surface of the base plate 22. This structure is merited in that the base scale 1 can be produced from other materials not having insulation properties. Incidentally, it will be noted that the printed electrodes 21 expose outside, so that it will be recommended to shield the exposed surface with the coating layer 27.

The material for the base scale 1 and the slider 10 are not only to be engineering plastics composed with PBT resin and additional mineral and CFRP but carbon fiber reinforced plastic using a base material such as nylon resin having stiffness properties to which a fiber such as glass is supplied. Incidentally, the base material and the supplied material may naturally be other resins and fibers. Taking for instance the base material, ABS resin and jyuracon (polyacetal resin) having high wear-resistant properties may be used. The supplied material may be a single fiber such as glass fiber or KEVLAR (trademark) otherwise a composite fiber thereof.

Referring to the electrically conductive ink used for printing the electrodes 21, it contains carbon graphite and polyester resins in the above mentioned embodiments but may be made of carbon paste and a medium or made of silver paste.

The base plate 22 for the main scale is not only limited to one made of polyester but may be another synthetic resin such as triacetate, polystyrene or the like.

It should be naturally understood that the present invention can be applied to other apparatus than the slide calipers, for example, a measuring apparatus such as a height gauge and a feeding value displaying apparatus for a machine tool such as a drilling machine. If the main scale is formed into a web state and then applied on a similar web shaped plastic member made of metal or synthetic resin, a tape measure digitally displaying the measured value can be provided.

As has been mentioned above, in accordance with the present invention, desirable high-volume production and reduced cost can be achieved.

What is claimed is:

1. An electrical capacitance instrument having a main scale of a measuring standard, a main body defined by the main scale, and a measuring element adapted to move in relation to the main body to thereby measure a displacement value of the measuring element relative to the main body, the electrical capacitance instrument comprising;

a base plate disposed on the main body;

a plurality of electrodes printed at predetermined intervals over the base plate with an electrically conductive ink along a movement direction of the measuring element; and a bonding layer formed over the plurality of electrodes and between the base plate and the main body.

2. The electrical capacitance instrument according to claim 1, wherein the base plate is made of insulator film.

3. The electrical capacitance instrument according to claim 2, wherein said main scale is applied to the main body by means of the bonding layer.

4. The electrical capacitance instrument according to claim 3, wherein the base plate is made of a transparent material, further comprising a decorative printing layer disposed between the base plate and the plurality of electrodes.

5. The electrical capacitance instrument according to claim 2, wherein the base plate is made of a film having plasticity.

6. The electrical capacitance instrument according to claim 1, wherein the main body is made of a material having insulation properties.

7. The electrical capacitance instrument according to claim 1, wherein the main body is made of engineering plastics.

8. The electrical capacitance instrument according to claim 1, wherein the main body is made of a material having insulation properties, and wherein the plurality of electrodes are shielded by a coating layer having insulation properties.

9. The electrical capacitance instrument according to claim 1, the main body comprising:

a base scale having at least one measuring jaw; and a measuring element having at least one measuring jaw, wherein the measuring element is adapted to move along the base scale in a sliding contact state with the base scale and the at least one measuring jaw of the measuring element corresponds to the at least one measuring jaw of the base scale.

10. A method of manufacturing an electrical capacitance instrument having a main scale of a measuring standard, a main body defined by the main scale, and a measuring element adapted to move in relation to the main body to thereby measure a displacement value of the measuring element relative to the main body, the method comprising:

printing a plurality of electrodes over a base plate made of an insulator film at predetermined intervals with an electrically conductive ink to form the main scale;

forming a bonding layer over the plurality of electrodes and the base plate; and applying the base plate to the main body by means of the bonding layer so that the bonding layer is between the main body and the base plate.

11. A method of manufacturing an electrical capacitance instrument according to claim 10, wherein the base plate is made of a transparent material, further comprising forming a decorative printing layer over the base plate and printing the plurality of electrodes on the decorative printing layer.

12. A method of manufacturing an electrical capacitance instrument according to claim 10, wherein the main body is formed by means of an injection mold using a material having insulation properties.

13. A method of manufacturing an electrical capacitance instrument according to claim 11, wherein the main body is formed by means of an injection mold using a material having insulation properties.

\* \* \* \* \*